United States Patent
Snyder

(10) Patent No.: US 6,815,380 B2
(45) Date of Patent: Nov. 9, 2004

(54) HIGH PERFORMANCE KRAFT FACING FOR FIBERGLASS INSULATION

(75) Inventor: James G. Snyder, Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/894,671

(22) Filed: Jun. 27, 2001

(65) Prior Publication Data

US 2002/0182965 A1 Dec. 5, 2002

Related U.S. Application Data

(63) Continuation-in-part of application No. 09/867,260, filed on May 29, 2001, now abandoned.

(51) Int. Cl.$^7$ .......................... B32B 17/02; B32B 27/12; B32B 27/32
(52) U.S. Cl. .................. 442/180; 442/394; 442/398
(58) Field of Search ................... 442/180, 394, 442/398

(56) References Cited

U.S. PATENT DOCUMENTS

| | | | |
|---|---|---|---|
| 3,955,031 A | | 5/1976 | Jones et al. |
| 4,158,713 A | | 6/1979 | Degens |
| 4,366,203 A | * | 12/1982 | Briggs ..................... 428/304.4 |
| 4,701,359 A | | 10/1987 | Akao |
| 4,764,420 A | | 8/1988 | Gluck et al. |
| 4,927,705 A | | 5/1990 | Syme et al. |
| 4,952,441 A | | 8/1990 | Bose et al. |
| 5,030,518 A | | 7/1991 | Keller |
| 5,051,144 A | | 9/1991 | Kistner |
| 5,277,955 A | | 1/1994 | Schelhorn et al. |
| 5,318,644 A | * | 6/1994 | McBride et al. ........... 156/62.2 |
| 5,362,539 A | | 11/1994 | Hall et al. |
| 5,466,317 A | | 11/1995 | Lause et al. |
| 5,624,726 A | | 4/1997 | Sanocki et al. |
| 5,733,624 A | | 3/1998 | Syme et al. |
| 5,746,854 A | | 5/1998 | Romes et al. |
| 5,804,020 A | | 9/1998 | Akao et al. |
| 5,871,830 A | | 2/1999 | Miller |
| 5,922,626 A | | 7/1999 | Pelzer |
| 5,987,833 A | | 11/1999 | Heffelfinger et al. |
| 6,083,603 A | | 7/2000 | Patel et al. |
| 6,128,884 A | * | 10/2000 | Berdan, II et al. ....... 52/742.12 |
| 6,191,057 B1 | | 2/2001 | Patel et al. |
| 6,357,504 B1 | * | 3/2002 | Patel et al. ................. 156/499 |

FOREIGN PATENT DOCUMENTS

| | | |
|---|---|---|
| WO | WO 99/63175 | 12/1999 |
| WO | WO 02/096641 | 12/2003 |

* cited by examiner

*Primary Examiner*—Terrel Morris
*Assistant Examiner*—Christopher Pratt
(74) *Attorney, Agent, or Firm*—Inger H. Eckert; Maria C. Gasaway

(57) ABSTRACT

A process for preparing a fiberglass insulation product, including the steps of: (a) providing a layer of kraft paper, (b) coating the kraft paper layer with from 2 to 10 pounds of HDPE or of polypropylene per 3000 square feet of the paper to form an HDPE-kraft laminate or a polypropylene-kraft laminate, (c) coating the HDPE-kraft or polypropylene-kraft laminate with from 3 to 10 pounds of LDPE per 3000 square feet of the HDPE-kraft laminate or polypropylene-kraft laminate to form an LDPE-HDPE-kraft laminate or an LDPE-polypropylene-kraft laminate, (d) adjusting the temperature of the LDPE-HDPE-kraft laminate or the LDPE-polypropylene-kraft laminate so that the LDPE becomes tacky while the HDPE or polypropylene remains solid, (e) providing a layer of fiberglass wool, and (f) contacting the LDPE layer of the LDPE-HDPE-kraft laminate or of the LDPE-polypropylene-kraft laminate with the fiberglass wool layer with pressure and cooling to bond the LDPE-HDPE-kraft laminate or LDPE-polypropylene-kraft laminate to the fiberglass wool layer to form a fiberglass insulation product.

12 Claims, 1 Drawing Sheet

HIGH PERFORMANCE KRAFT FACING FOR FIBERGLASS INSULATION

CROSS REFERENCE TO RELATED APPLICATION

This application is a continuation in part of U.S. patent application Ser. No. 09/867,260 filed May 29, 2001, now abandoned, which is incorporated by reference in its entirety.

TECHNICAL FIELD AND INDUSTRIAL APPLICABILITY OF THE INVENTION

This invention relates to improvements in the art of manufacturing thermal insulation batts.

This invention provides process for preparing a fiberglass insulation product. The process of this invention includes the steps of: (a) providing a layer of kraft paper, (b) coating the kraft paper layer with a high melting point film such as high density polyethylene (HDPE) or of polypropylene form an HDPE-kraft laminate or a polypropylene-kraft laminate, (c) coating the HDPE-kraft laminate with a low melting point film such as low density polyethylene (LDPE) to form an LDPE-HDPE-kraft laminate or an LDPE-polypropylene-kraft laminate, (d) adjusting the temperature of the LDPE-HDPE-kraft laminate or the LDPE-polypropylene-kraft laminate so that the LDPE becomes tacky while the HDPE or polypropylene remains solid, (e) providing a layer of fiberglass wool, and (f) contacting the LDPE layer of the LDPE-HDPE-kraft laminate or of the LDPE-polypropylene-kraft laminate with the fiberglass wool layer to bond the LDPE-HDPE-kraft laminate or LDPE-polypropylene-kraft laminate to the fiberglass wool layer to form a fiberglass insulation product.

BACKGROUND OF THE INVENTION

Thermal insulation batts are often comprised of a relatively thick layer of low density bulk insulating material, such as fiberglass wool, faced with for instance asphalt-coated kraft paper facing. The asphalt coating is used both to adhere the layer of thermal insulation to the facing and also to provide vapor barrier properties to the paper. Alternatively, foil-backed paper can be attached to the fiberglass wool with a thin coat of asphalt. Another approach to vapor retardance is to apply a separate 4- to 6-mil polyethylene film over installed insulation. Guardian Fiberglass, Inc. produces a polypropylene scrim kraft for insulation applications.

Such insulation products are generally provided in the form of continuous lengths (packaged as rolls) or of individual panels, or batts, with facing materials on one or both major surfaces to enable the insulation product to be handled more easily and to be fastened in position for insulating purposes, and to minimize dusting of the fiberglass fibers within the insulation product. In most instances, the provision of a facing that forms a vapor barrier is desirable in order to prevent water vapor passing through the insulation product and condensing on a cold surface.

Facing materials may be adhered to the fiberglass fiber blanket in a number of ways. For example, solvent-based or water-based adhesives or hot-melt adhesives may be applied to the facing material or to the surface of the fiberglass wool blanket, with the fiberglass wool blanket and the facing material then being brought together to surface bond the two materials. Alternatively, the facing material itself may be rendered adhesive before application to the fiberglass wool blanket. For example, a thermoplastic material such as a synthetic polymer or a bituminous layer on one surface of the facing material may be heat softened for that purpose. However, the heat treatment of polyethylene—the most commonly used synthetic polymer in this context—may destroy any water vapor barrier properties it possesses.

A product which has met with some commercial success is a kraft paper/polyethylene vapor barrier manufactured by Owens Corning, which is bonded via the polyethylene to a glass wool blanket. A more sophisticated product consists of an aluminum foil/kraft paper vapor barrier adhesively bonded on its kraft paper surface to a glass wool blanket. However, the aluminum foil incorporated as the vapor barrier renders it much more expensive.

The organization known as ASTM has published—under the designation E 96-00 (published July 2000)—a description of test methods to determine water vapor transmission of materials through which the passage of water vapor may be of importance, such as paper and other sheet materials. Those test methods permit the determination of PERM values for the sheet materials. The PERM values reflect the water vapor transmission and permeance of the materials.

Many conventional insulation facing products fail to consistently meet PERM requirements. PERM values greater than 1.0 are considered to be unacceptable for the purposes of the present invention.

SUMMARY OF THE INVENTION

The present invention provides a kraft facing for fiberglass insulation that consistently meets PERM requirements.

One embodiment of the present invention is a flexible planar laminate comprising an external support layer of kraft paper to which is adhered a central vapor barrier layer of high density polyethylene (HDPE) or polypropylene, to which is adhered an internal adhesive layer of low density polyethylene (LDPE). The flexible planar laminate preferably comprises from 2 to 10 pounds, most preferably 7 pounds, of HDPE and from 3 to 10 pounds, most preferably 5 pounds, of LDPE per ream (3000 square feet) of kraft paper having a weight of 30 to 50 lbs/ft$^2$. In the flexible planar laminate of this invention, the softening point of the LDPE is from 25 to 125° F. and preferably from 25 to 75° F. lower than the softening point of the HDPE. When polypropylene is used as the barrier layer, the softening point of the LDPE is 25 to 150° F. and preferably from 25 to 75° F. lower than the softening point of the polypropylene.

Another embodiment of the present invention is a process for preparing a fiberglass insulation product. This process involves: (a) providing a layer of kraft paper, (b) coating the kraft paper layer with from 2 to 10 pounds of HDPE or of polypropylene per 3000 square feet of said paper to form an HDPE-kraft laminate, (c) coating the HDPE-kraft or PP-kraft laminate with from 3 to 10 pounds of LDPE per 3000 square feet of said HDPE-kraft or PP-kraft laminate to form an LDPE-HDPE (or PP)-kraft laminate, (d) adjusting the temperature of the LDPE-HDPE (or PP)-kraft laminate, e.g. with an infra-red heater, a microwave heater, or a rotating hot roll, so that the LDPE becomes tacky while the HDPE or PP remains solid, (e) providing a layer of fiberglass wool, and (f) contacting the LDPE layer of the LDPE-HDPE (or PP)-kraft laminate with the fiberglass wool layer with pressure and cooling to bond said LDPE-HDPE (or PP)-kraft laminate to said fiberglass wool layer to form a fiberglass insulation product.

Still another embodiment of the present invention is a fiberglass insulation product comprising a layer of fiberglass wool and a flexible planar laminate as described above.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION AND PREFERRED EMBODIMENTS OF THE INVENTION

Figure 1:
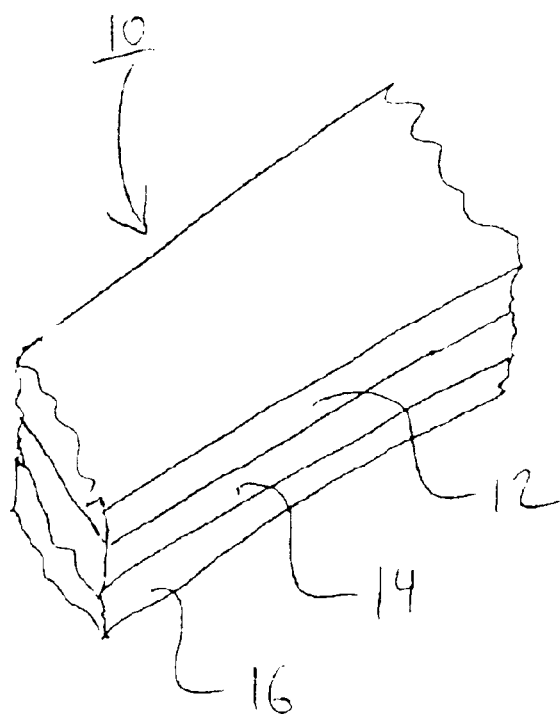
FIG. 1 is a perspective view (not to scale) illustrating a facing sheet in accordance with the present invention.
Figure 2:
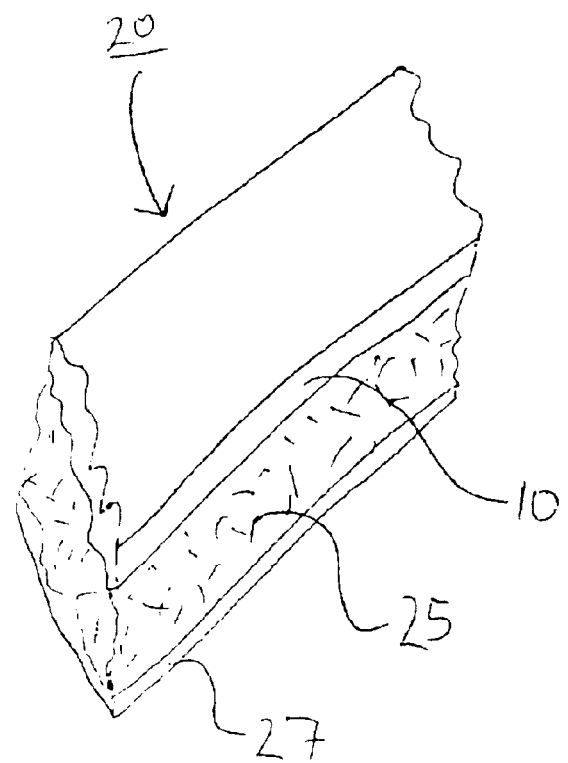
FIG. 2 is a perspective view (not to scale) illustrating an insulation product in accordance with the present invention.

As illustrated in FIG. 1, impermeable facing material 10 of this invention may comprise a kraft paper layer 12, a high density polyethylene layer 14, and a low density polyethylene layer 16. As illustrated in FIG. 2, insulation product 20 of this invention may comprise an impermeable facing material layer 10 (where layer 10 comprises kraft paper, HDPE, and LDPE), a fiberglass wool layer 25, and a permeable kraft paper layer 27.

Kraft Paper

The paper component in the present invention is preferably kraft paper because of its ready availability and low cost, its inherent strength and durability, and its ability to be readily laminated to the preferred polyethylene films. The kraft paper suitably has a thickness corresponding to a weight of 30 to 50 lbs/3000 ft$^2$, preferably 35 to 40 lbs/3000 ft$^2$. However, other types of paper such as recycled paper or calendered paper may be used, especially where particular properties, such as visual appearance or susceptibility to the application of other products, such as printing, may be desired. Of course, kraft paper is itself susceptible to printing, for example in order to carry product information.

HDPE or PP

The specific density of HDPE is approximately 0.94. The high density polyethylene film component of the present invention suitably has a thickness corresponding to a weight of 10 to 50 g/m$^2$, preferably 25 to 35 g/m$^2$. This thickness is generally sufficient to prevent penetration by individual fibers of the fibrous fiberglass wool blanket and thereby retain the vapor-barrier characteristics of the product while avoiding the addition of unnecessary weight to the insulation product. When polypropylene is used as the barrier layer, it is used in generally the same amount or slightly less than the amount of HDPE.

LDPE

The specific density of LDPE is approximately 0.9235. The low density polyethylene film component of the present invention suitably has a thickness corresponding to a weight of 5 to 40 g/m$^2$, preferably 15 to 25 g/m$^2$. This thickness is generally sufficient to provide adhesion to the fibrous fiberglass wool blanket.

Making the Facing

A kraft paper having a weight, e.g. of 70 g/m$^2$, in the form of a roll having a width, e.g. of 1.2 m, is passed at a linear speed, e.g. of 19 m/min over a number of idler rolls to an application roll where it is joined to a roll of HDPE and coated on one surface with the HDPE. The HDPE-coated kraft paper is then passed at a similar linear speed over a number of idler rolls to an application roll where it is joined to a roll of LDPE and coated on the HDPE side with the LDPE.

Fiberglass

The fiberglass wool blanket may comprise any one or more of the materials traditionally used for making fiberglass wool insulation products, although other mineral wool insulation materials, such as slag or basalt, could be used. In the context of the present invention, however, fibrous glass is preferred. When a fibrous glass blanket is used for forming the insulation products of the invention, it is preferred that the fibrous glass blanket contains a binder, for example a phenolic resin binder, suitably applied to the fibers immediately after fiberization.

The Insulation Product

In a preferred aspect of the invention, low density polyethylene is applied to the high density polyethylene face of a kraft paper/HDPE laminate, which is then heated to a temperature of 90 to 150° C., for example approximately 110° C. This elevated temperature serves to soften the low density polyethylene, thereby rendering the LDPE more susceptible to direct bonding with the fibers of the fiberglass wool blanket. This heating step may be carried out by subjecting the coated facing to radiant heat, for example by conveying it past an infrared heater, or by passing it over a heated roller, for example an oil filled roller, or by any combination of these.

Following application of the LDPE to the facing material and following any optional heating step, the facing material is applied to the fiberglass wool blanket. The assembled facing/fiberglass wool blanket is then compressed to ensure adhesion of the fiberglass wool blanket to the facing material and to force a portion of the LDPE into the thickness of the fiberglass wool blanket. In this manner, adhesion of the facing to the glass wool becomes more than just a surface contact phenomenon and a far stronger and more durable insulation product is formed.

The degree of compression to which the assembly of fiberglass wool blanket and facing material is subjected for enhancing adhesion will depend upon the density and compressibility of the fiberglass wool blanket and the degree of LDPE penetration required relative to the amount of LDPE applied. In this respect, since a fibrous glass blanket containing binder generally has a greater fiber density at its surface than in its interior as a result of its loft being set in the binder curing oven, some compression of the blanket will be necessary in most cases to force the LDPE through the more dense surface layer of fiber towards the interior of the blanket for good bonding. Generally, all that will be required to provide satisfactory enhancement of adhesion is to compress the assembly to approximately 50 to 95% of its uncompressed thickness. Such compression can be applied between an upper roller and a lower roller or conveyor surface. Alternatively, it can be provided by passing the assembly of fiberglass wool blanket and facing material under tension around a roller surface. Clearly, it is not required or desired to retain the fiberglass wool blanket in a compressed state for any significant period of time since it is undesirable for the LDPE to dry or cure while the blanket is in a compressed state. Indeed, all that is required is that the LDPE should be forced to penetrate into the thickness of the blanket and that the LDPE is then permitted to dry or cure with the blanket in its recovered state.

The fiberglass wool blanket preferably has a thickness of approximately 20 to 330 mm and a bulk density of 8 to 40 kg/M$^3$ (0.4 to 2.5 pcf).

Following its release from compression, the blanket may be cut immediately into individual insulation batts. Preferably, however, the LDPE is first permitted to completely dry and/or cure (or at least to almost completely dry and/or cure so as to avoid slippage between the fiberglass wool blanket and the facing material) and the blanket can then be cut into individual batts which may then be folded and/or compressed and packaged for storage and transportation. Alternatively, the blanket may be rolled up under compression and packaged for storage and transportation. Generally, the LDPE will require only a few seconds to dry and/or cure to the stage where it is no longer tacky, especially at the slightly elevated temperatures prevailing in the vicinity of the heating roller referred to above. The cured blanket or batt may be compressed to the usual degree.

At the intended site of installation, the compressed and packaged insulation product may be unpacked and allowed to recover its original thickness and then utilized in any one of a number of insulating situations.

EXAMPLES

Example 1

A layer of kraft paper weighing 40 pounds per ream was coated with HDPE at a rate of 7 pounds per ream of said paper to form an HDPE-kraft laminate. The HDPE-kraft laminate was coated with LDPE at a rate of 5 pounds per ream of said HDPE-kraft laminate to form an LDPE-HDPE-kraft laminate. The temperature of the LDPE-HDPE-kraft laminate was adjusted so that the LDPE became tacky while the HDPE remained solid. A layer of fiberglass wool was provided. The LDPE layer of the LDPE-HDPE-kraft laminate was contacted with the fiberglass wool layer under pressure and was then cooled to bond said LDPE-HDPE-kraft laminate to said fiberglass wool layer to form a fiberglass insulation product.

Circular specimens of the LDPE-HDPE-kraft laminate, having a diameter of 146±1 mm, were prepared. For each sample, four test dishes were provided. Three of the test dishes were filled to the top with calcium chloride desiccant. One of the test specimen dish assemblies has no desiccant and is used as a dummy to compensate for variations due to temperature or barometric pressure or both. One test specimen was placed in each of the four test dishes such that the edge of the test specimen rested on the recessed lip. A specimen centering ear template was positioned on each test specimen such that it was centrally located. Hot wax was applied to the test specimen area that was exposed around the outside edge of the specimen centering ear template. Once the wax was cooled, the specimen centering ear template was removed. The test dish assemblies were then placed into reclosable poly bags or a desiccator while awaiting weighing. The test dish assemblies were then each weighed to the nearest 0.0001 gram. The test dish assemblies were then placed into a test chamber operating at 23±0.6° C. The date, time (to the nearest 5 minutes), temperature (to the nearest 0.1 decrees C.), relative humidity (to 0.5%), and barometric pressure (to nearest 0.1 kPa) were recorded. Each test dish assembly was weighed daily until a constant weight gain was attained. A constant weight gain occurs when the differences between successive weighings are within 1%.

First the rate of water vapor transmission (G/t) was calculated, using a mathematical least squares regression analysis of the weight change (modified by the weight change of the dummy specimen) as a function of time, in grams/h. Then the water vapor transmission for individual specimens was calculated using the equation WVT=(G/t)/A where WVT is water vapor transmission rate, $g/h \cdot m^2$, G is weight change in grams, t is time during which the weight gain occurred in hours, and A is the test area (test dish mouth area) in square meters.

The results for the three specimens were 0.3727, 0.4410, and 0.3932, for an average of 0.4023, well under the target maximum of 1.0.

Example 2

A layer of kraft paper weighing 40 pounds per ream was coated with HDPE at a rate of 5 pounds per ream of said paper to form an HDPE-kraft laminate. The HDPE-kraft laminate was coated with LDPE at a rate of 4 pounds per ream of said HDPE-kraft laminate to form an LDPE-HDPE-kraft laminate. The temperature of the LDPE-HDPE-kraft laminate was adjusted so that the LDPE became tacky while the HDPE remained solid. A layer of fiberglass wool was provided. The LDPE layer of the LDPE-HDPE-kraft laminate was contacted with the fiberglass wool layer under pressure and was then cooled to bond said LDPE-HDPE-kraft laminate to said fiberglass wool layer to form a fiberglass insulation product.

Circular specimens of the LDPE-HDPE-kraft laminate, having a diameter of 146±1 mm, were prepared. For each sample, four test dishes were provided. Three of the test dishes were filled to the top with calcium chloride desiccant. One of the test specimen dish assemblies has no desiccant and is used as a dummy to compensate for variations due to temperature or barometric pressure or both. One test specimen was placed in each of the four test dishes such that the edge of the test specimen rested on the recessed lip. A specimen centering ear template was positioned on each test specimen such that it was centrally located. Hot wax was applied to the test specimen area that was exposed around the outside edge of the specimen centering ear template. Once the wax was cooled, the specimen centering ear template was removed. The test dish assemblies were then placed into reclosable poly bags or a desiccator while awaiting weighing. The test dish assemblies were then each weighed to the nearest 0.0001 gram. The test dish assemblies were then placed into a test chamber operating at 23±0.6° C. The date, time (to the nearest 5 minutes), temperature (to the nearest 0.1 decrees C.), relative humidity (to 0.5%), and barometric pressure (to nearest 0.1 kPa) were recorded. Each test dish assembly was weighed daily until a constant weight gain was attained. A constant weight gain occurs when the differences between successive weighings are within 1%.

First the rate of water vapor transmission (G/t) was calculated, using a mathematical least squares regression analysis of the weight change (modified by the weight change of the dummy specimen) as a function of time, in grams/h. Then the water vapor transmission for individual specimens was calculated using the equation WVT=(G/t)/A where WVT is water vapor transmission rate, $g/h \cdot m^2$, G is weight change in grams, t is time during which the weight gain occurred in hours, and A is the test area (test dish mouth area) in square meters.

The results for the three specimens were 1.1669, 0.5309, and 1.1199, for an average of 0.9392, under the target maximum of 1.0.

Example 3

The LDPE-bearing facing material of Example 1 is passed over a heating roll and thereby brought to a temperature of approximately 110° C. and immediately contacted with a fibrous glass blanket having a width of 1.2 m, a thickness of 280 mm, and a density of approximately 11.0 kg/M³. The resulting insulation assembly is immediately compressed against the heating roll by a roller to a thickness of 210 mm.

20 m downline of the roller, the resulting insulation assembly is chopped in the transverse direction by a blade into lengths of insulation material having a size of 1.2 m by 5.5 m. The 5.5 m lengths of insulation product are immediately rolled and compressed to a thickness of 30 mm and packaged for storage and transportation.

The insulation material produced as described above has a robust structure which is resistant to repeated handling, and the facing cannot be separated from the fibrous glass blanket without destroying the whole structure of the material.

What is claimed is:

1. A flexible planar laminate comprising layer of kraft paper to which is adhered a vapor barrier layer consisting essentially of high melting point polymer to which is adhered an adhesive layer of low melting point polymer, wherein the water vapor transmission rate for said laminate is under about 1.0 g/h·m².

2. The flexible planar laminate of claim 1 wherein the high melting point polymer is high density polyethylene (HDPE) or of polypropylene.

3. The flexible planar laminate of claim 2 wherein the high melting point polymer is low density polyethylene (LDPE).

4. The flexible planar laminate of claim 3 which comprises from 2 to 10 pounds of HDPE and from 3 to 10 pounds of LDPE per 3000 square feet of kraft paper having a weight of 30 to 50 pounds per 3000 square feet.

5. The flexible planar laminate of claim 4 which comprises 7 pounds of HDPE and 5 pounds of LDPE per 3000 square feet of kraft paper.

6. The flexible planar laminate of claim 3 in which the barrier layer is HDPE and the softening point of the LDPE is from 25 to 125° F. lower an the softening point of the HDPE.

7. The flexible planar laminate of claim 3 in which the barrier layer is polypropylene and the softening point of the LDPE is from 25 to 75° F. lower than the softening point of the polypropylene.

8. A fiberglass insulation product comprising a layer of fiberglass wool and a flexible planar laminate comprising a) an external support layer of kraft paper;

b) a central vapor barrier layer of high melting point polymer a adhered to said kraft paper; and c) an internal adhesive layer of low melting point polymer adhered to said central vapor barrier layer;

wherein said layer of fiberglass wool is adhered to said internal adhesive layer;

wherein the water vapor transmission rate for said laminate is under about 1.0 g/h·m².

9. The fiberglass insulation product of claim 8 wherein the high melting point polymer is high density polyethylene (HDPE) or polypropylene.

10. The fiberglass insulation product of claim 9 wherein the low melting point polymer is low density polyethylene (LPDE).

11. The fiberglass insulation product of claim 10 in wich the flexible planar laminate comprises from 2 to 10 pounds of HDPE and from 3 to 10 pounds of LDPE per 3000 square feet of kraft paper having a weight of 30 to 50 lbs/ft².

12. The fiberglass insulation product of claim 9 in which the flexible planar laminate comprises 7 pounds of HDPE and 5 pounds of LDPE per 3000 square feet of kraft paper.

* * * * *